(12) United States Patent
Lagarrigue et al.

(10) Patent No.: US 11,954,954 B2
(45) Date of Patent: Apr. 9, 2024

(54) ACQUISITION SYSTEM FOR AIRCRAFT COMPRISING AN AVIONICS RACK AND AT LEAST ONE RECORDING DEVICE, AND ASSOCIATED AIRCRAFT

(71) Applicants: Airbus SAS, Blagnac (FR); Airbus Operations SAS, Toulouse (FR)

(72) Inventors: Alain Lagarrigue, Rouffiac Tolosan (FR); David Cumer, Pin-Balma (FR); Subodh Kumar Keshri, Colomiers (FR)

(73) Assignees: Airbus SAS, Blagnac (FR); Airbus Operations SAS, Toulouse (FR)

( * ) Notice: Subject to any disclaimer, the term of this patent is extended or adjusted under 35 U.S.C. 154(b) by 812 days.

(21) Appl. No.: 16/661,553

(22) Filed: Oct. 23, 2019

(65) Prior Publication Data
US 2020/0134945 A1 Apr. 30, 2020

(30) Foreign Application Priority Data
Oct. 25, 2018 (FR) ........................ 1859894

(51) Int. Cl.
*G07C 5/08* (2006.01)
*B64D 45/00* (2006.01)
*G05B 23/02* (2006.01)

(52) U.S. Cl.
CPC .......... *G07C 5/0816* (2013.01); *B64D 45/00* (2013.01); *G05B 23/0283* (2013.01);
(Continued)

(58) Field of Classification Search
CPC .... G07C 5/0808; G07C 5/085; G07C 5/0816; B64D 45/00; B64D 2045/0065; B64D 2045/0085; G05B 23/0283
See application file for complete search history.

(56) References Cited

U.S. PATENT DOCUMENTS

| 8,493,715 B1 | 7/2013 | Angelucci |
| 2002/0035416 A1 | 3/2002 | De Leon |

(Continued)

FOREIGN PATENT DOCUMENTS

| CN | 107554805 A | 1/2018 |
| JP | 2000339067 A * | 8/2000 |

(Continued)

OTHER PUBLICATIONS

Data Compression, Wikipedia, viewed Jan. 24, 22 (Year: 2022).*
French Search Report; priority document.

*Primary Examiner* — Maceeh Anwari
(74) *Attorney, Agent, or Firm* — Greer, Burns & Crain, Ltd.

(57) ABSTRACT

To reduce the bulk of the acquisition systems embedded onboard an aircraft and dedicated to predicting failures, an acquisition system is provided comprising an avionics rack and at least one recording device, in which the avionics rack comprises a front panel provided with at least one test connector configured to be connected to all or some of the data buses of the aircraft, each recording device comprises a housing and an acquisition port, the acquisition port being provided on an outer face of the housing, the acquisition port of each recording device is engaged with a corresponding test connector of the avionics rack, each recording device is configured to acquire at least some signals applied to the acquisition port by the corresponding test connector, and to store the acquired signals.

7 Claims, 2 Drawing Sheets

(52) U.S. Cl.
CPC .......... *G07C 5/0808* (2013.01); *G07C 5/085* (2013.01); *B64D 2045/0065* (2013.01); *B64D 2045/0085* (2013.01)

(56) References Cited

U.S. PATENT DOCUMENTS

| | | | |
|---|---|---|---|
| 2004/0223294 | A1 | 11/2004 | Kitaoka |
| 2007/0124042 | A1 | 5/2007 | Monroe |
| 2009/0184574 | A1* | 7/2009 | Zavidniak ........... B60R 16/0215 307/9.1 |
| 2012/0095624 | A1* | 4/2012 | Budan .................. G07C 5/0858 701/14 |

FOREIGN PATENT DOCUMENTS

| | | |
|---|---|---|
| KR | 20110004373 U | 5/2011 |
| WO | 2013120144 A1 | 8/2013 |

* cited by examiner

ACQUISITION SYSTEM FOR AIRCRAFT COMPRISING AN AVIONICS RACK AND AT LEAST ONE RECORDING DEVICE, AND ASSOCIATED AIRCRAFT

CROSS-REFERENCES TO RELATED APPLICATIONS

This application claims the benefit of the French patent application No. 1859894 filed on Oct. 25, 2018, the entire disclosures of which are incorporated herein by way of reference.

FIELD OF THE INVENTION

The present invention relates to an acquisition system for aircraft.

The invention also relates to an aircraft equipped with such an acquisition system.

The invention is applied to the field of aeronautics, in particular to aircraft maintenance.

BACKGROUND OF THE INVENTION

Recent developments in aircraft maintenance have led to the application of methods that make it possible to predict failures on board an aircraft and to anticipate them, notably by replacing the defective parts before the occurrences of faults. In this way, the risks of flight delays and cancellations are reduced.

Such predictive methods require the acquisition of volumes of data which are several tens of times greater than the volumes of data usually analyzed. Such data are, typically, the data routed to the computers of the aircraft, originating, for example, from the different sensors with which the latter is equipped.

However, such predictive methods are accompanied by certain drawbacks. In particular, the significant volumes of data to be collected require the implementation of specific acquisition systems capable of acquiring and storing such volumes of data.

Such acquisition systems are generally disposed in the aircraft, in proximity to an avionics rack of the aircraft supporting the computer(s), which increases the bulk on board the aircraft, in particular in the vicinity of the avionics rack, or even in slots of the avionics rack usually reserved for electrical equipment.

Furthermore, the engagement of such acquisition systems on board an aircraft is often tedious, in as much as the architectures are likely to vary from one constructor to another, which generally requires the construction of tailor-made acquisition systems.

One aim of the invention is therefore to propose an acquisition system which is versatile and whose bulk is minimal.

SUMMARY OF THE INVENTION

To this end, the subject of the invention is an acquisition system of the abovementioned type, comprising an avionics rack and at least one recording device, in which the avionics rack comprises a front panel provided with at least one test connector configured to be connected to all or some of the data buses of the aircraft, each recording device comprising a housing and an acquisition port, the acquisition port being provided on an outer face of the housing, the acquisition port of each recording device being engaged with a corresponding test connector of the avionics rack, each recording device being configured to acquire at least some signals applied to the acquisition port by the corresponding test connector, and to store the acquired signals.

Indeed, an avionics rack, embedded onboard an aircraft, conventionally incorporates at least one test connector. Such a test connector is connected to all or some of the data buses of the aircraft in which the avionics rack is embedded, and is intended for the implementation of validation tests during the final steps of assembly of the aircraft. Now, such a test connector is, generally, not used after the aircraft has been delivered. Consequently, by connecting the recording device to the test connector of the avionics rack, an acquisition system is formed, and this is done without significant modification of the structure of the avionics rack or of that of the electrical equipment that it accommodates, whatever the constructor or manufacturer thereof.

Furthermore, since the recording device is likely to be produced with components for which the industry has great maturity, the result thereof is that the recording device has a very small volume, for example of the order of a liter, such that it generates an additional bulk which is marginal with respect to the situation in which the avionics rack is not equipped with any recording device. More specifically, since the acquisition port of the recording device is directly engaged with the test connector of the avionics rack, there is no need to arrange the recording device in a dedicated housing of the avionics rack. This gives the acquisition system according to the invention great versatility, and allows it to be implemented onboard most aircraft without major architectural modification.

According to other advantageous aspects of the invention, the acquisition system comprises one or more of the following features, taken alone or according to all technical possible combinations:

the recording device is, furthermore, configured to transmit, in at least one predetermined frequency band, all or some of the stored acquired signals;

the recording device is, furthermore, configured to apply a compression method to all or some of the stored acquired signals before their transmission;

the test connector and/or the acquisition port is/are compatible with an international aeronautical standard ARINC429 or ISO 11898 or MIL-STD-1553; and the recording device has a volume less than or equal to 10 L, preferably less than or equal to 5 L, for example less than or equal to 0.5 L.

Furthermore, the subject of the invention is an aircraft equipped with an acquisition system as defined above.

According to an advantageous aspect of the invention, the aircraft also comprises a communication antenna positioned at a distance from the avionics rack, the recording device being connected to the communication antenna.

BRIEF DESCRIPTION OF THE DRAWINGS

The invention will be better understood from the following description, given purely as a nonlimiting example and with reference to the attached drawings in which.

DETAILED DESCRIPTION OF THE PREFERRED EMBODIMENTS

Figure 1:
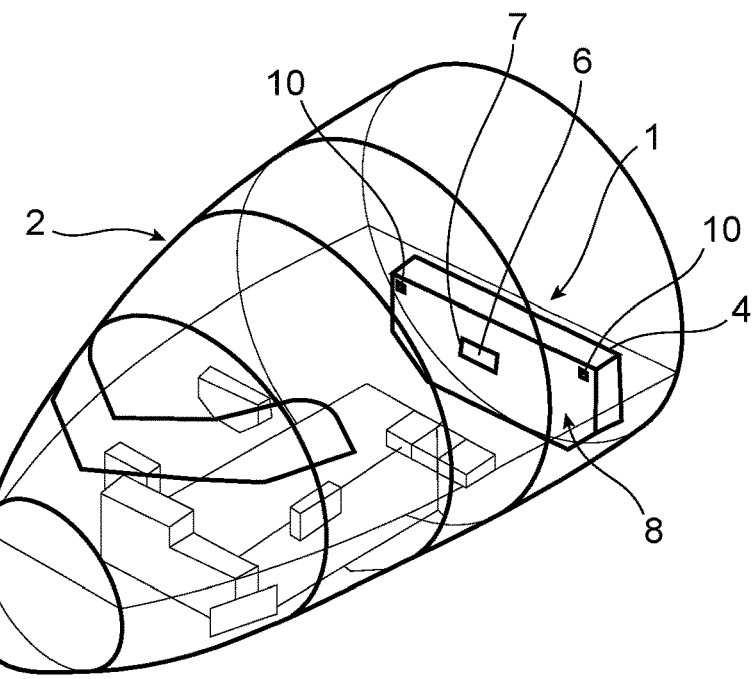
FIG. 1 is a perspective schematic view of an aircraft comprising an avionics rack of an acquisition system according to the invention.

An acquisition system 1 according to the invention is schematically represented in FIG. 1. The acquisition system 1 is embedded onboard an aircraft 2.

The acquisition system 1 comprises an avionics rack 4 and a recording device 5 that are connected to one another. Such a connection will be detailed hereinbelow.

The avionics rack 4 is intended to accommodate at least one electrical equipment item 6 in a corresponding housing 7. The electrical equipment item 6 is, for example, a computer. The avionics rack 4 is also intended to supply the electrical power necessary for the operation of each electrical equipment item 6.

Figure 2:
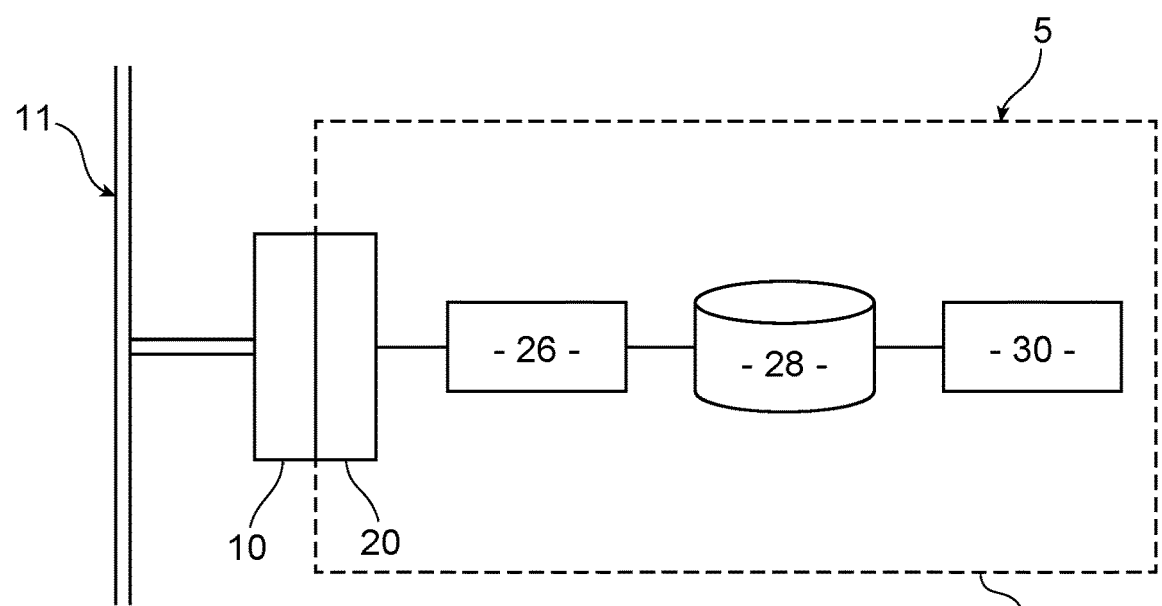
FIG. 2 is a schematic representation of a recording device of the acquisition system in FIG. 1.
Figure 3:
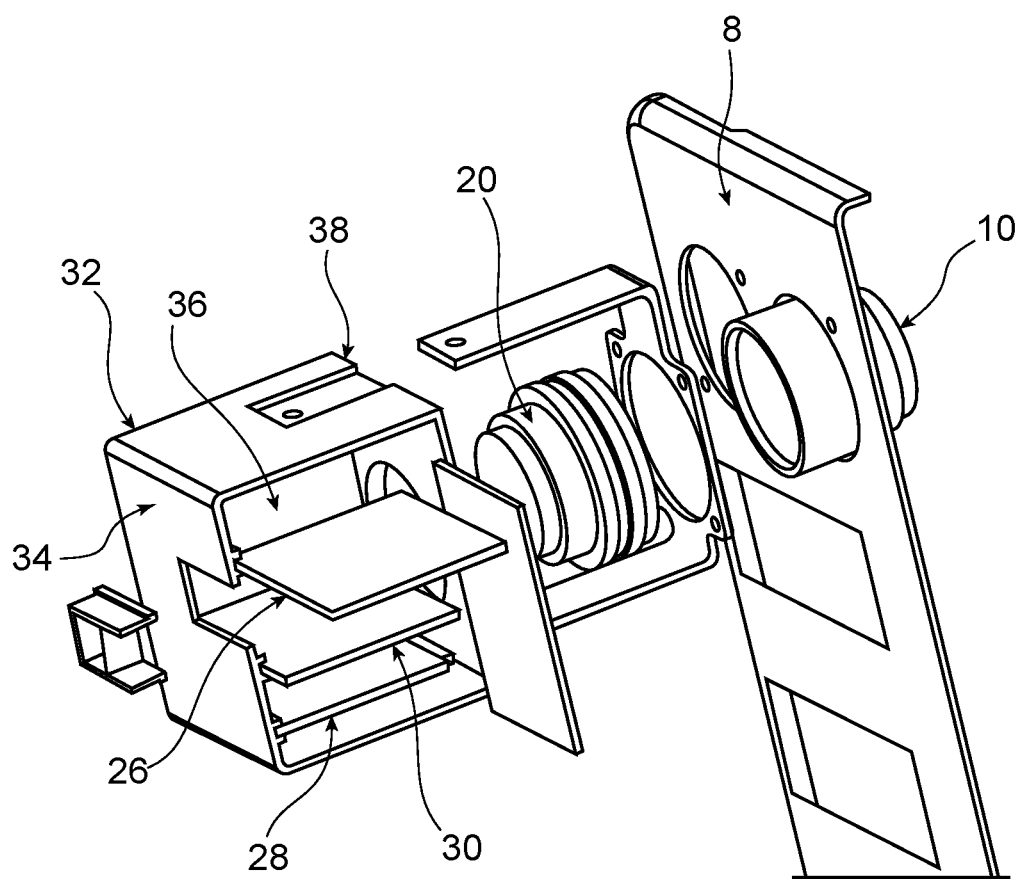
FIG. 3 is an exploded view of the recording device in FIG. 2.

The avionics rack 4 comprises a front panel 8 provided with a test connector. Such a test connector is represented in FIGS. 2 and 3 by the reference numeral 10.

The front panel 8 is conventionally intended for the loading, respectively the unloading, of each electrical equipment item 6 in, respectively from, the avionics rack 4.

Each test connector 10 is linked to all or some of the data buses 11 of the aircraft 2 (represented in FIG. 2), so that there are available, at the test connector 10, all or some of the signals exchanged between the electrical equipment 6 accommodated in the avionics rack 4 and other units of the aircraft 2, for example sensors or units to be controlled.

The data buses 11 are, for example, data buses defined by a current international aeronautical standard called "ARINC429", data buses suitable for the implementation of an aeronautical full-duplex switched Ethernet network (also called AFDX® network, or Avionics Full DupleX switched ethernet Network), or even communication buses of CAN (acronym for "Controller Area Network") type, defined by a current standard called "ISO 11898", or communication buses defined by a current international aeronautical standard called "MIL-STD-1553".

Furthermore, the test connector 10 is compatible with the standard according to which the data bus 11 is produced. In particular, the test connector 10 is produced according to the same standard as the data bus 11.

The test connector 10 is, for example, a test connector designated by the marketing designation "198VC", "199VC", "2792VCA", "2793VCA", "2794VCA", "2795VCA", "2796VCA", "2797VCA", "2798VCA", "2799VCA", "1200CV692-A", "1200CV694-A", "1200CV696-A", "1200CV694-A", "1000CV472-A", "1100VC693-A", "1100VC695-A", "1100VC697-A", or equivalent.

Each recording device 5 is configured to acquire and store all or some of the signals conveyed on the data buses 11 and which are available at the corresponding test connector 10 of the avionics rack 4.

As illustrated by FIG. 2, the recording device 5 comprises an acquisition port 20, a collection unit 26 and a memory 28.

The acquisition port 20 is connected, removably or permanently, to the corresponding test connector 10 of the avionics rack 4. More specifically, the acquisition port 20 of a given recording device 5 is engaged with the test connector 10 of the avionics rack 4.

The acquisition port 20 is compatible with the standard according to which the test connector 10 is produced; in particular, the acquisition port 20 is produced according to the same standard as the test connector 10. This is advantageous, in as much as no intervention on the avionics rack 4 is required to ensure compatibility between the avionics rack 4 and the recording device 5. Advantageously, the acquisition port has an integrated electrical power supply.

The collection unit 26 is connected to the acquisition port 20. The collection unit 26 is configured to acquire all or some of the signals applied by the connector 10 of the avionics rack 4 to the corresponding acquisition port 20.

For example, a configuration file stored in the recording device 5 defines the nature of the data to be acquired by the collection unit 26.

The memory 28 is connected to the collection unit 26, and is configured to store the signals acquired by said collection unit 26. For example, the memory 28 is a flash memory.

Preferably, the memory 28 has a capacity of several tens of gigabytes.

Advantageously, the recording device 5 also comprises a wireless communication module 30 connected to the memory 28.

The wireless communication module 30 is configured to transmit, in at least one predetermined frequency band, the signals acquired by the collection unit 26 which have been stored in the memory 28. Preferably, the wireless communication module 30 is configured to transmit, when the aircraft 2 is in a predetermined situation, the acquired signals stored in the memory 28. As an example, the wireless communication module 30 is configured to transmit the acquired signals stored in the memory 28 as a function of a flight phase of the aircraft 2, for example as soon as the aircraft 2 is on the ground.

Preferably, the wireless communication module 30 is configured to transmit all or some of the signals acquired by the collection unit 26 which have been stored in the memory 28, and this is done in order to limit the volume of data transmitted. For example, the configuration file defines the nature of the data to be transmitted by the wireless communication module 30.

Advantageously, the wireless communication module 30 is configured to apply a compression method to the signals before their transmission, in order to reduce the volume of the data transmitted.

The wireless communication module 30 is, for example, configured to transmit the acquired signals in at least one frequency band defined by the "IMT-advanced" specifications drawn up by the standardization organizations ITU-R and ETSI (generally called "4G standards").

The presence of such a wireless communication module 30 is advantageous in as much as it makes physical access to the recording device 5 (which is likely to be difficult to access) unnecessary for the reading of the data stored in the memory 28.

Preferably, the wireless communication module 30 is connected to a communication antenna (not represented) positioned outside of the avionics rack 4. The connection to such a communication antenna remote from the avionics rack 4 is advantageous, in as much as it makes it possible to safeguard against electromagnetic interference between the wireless communication module 30 on the one hand, and the avionics rack 4 and the electrical equipment 6 that it accommodates on the other hand. The use of such a communication antenna also allows the wireless communication module to communicate with installations on the ground during the landing and taxiing phases of the aircraft 2.

As appears in FIG. 3, the recording device 5 also comprises a housing 32 comprising a wall 34 delimiting a cavity 36. The collection unit 26, the memory 28 and, possibly, the wireless communication module 30, are housed in the cavity 36. Furthermore, the acquisition port 20 is provided on an outer face 38 of the wall 34 of the housing 32, that is to say, a face of the wall 34 which is oriented opposite the cavity 36. In use, said outer face 38 faces the front panel 8 of the avionics rack 4.

Advantageously, the housing 32 is such that the recording device 5 has a volume less than or equal to 10 L (liters), preferably less than or equal to 5 L, for example less than or equal to 0.5 L.

The operation of the acquisition system 1 will now be described.

First of all, each recording device 5 is connected to the avionics rack 4. More specifically, the acquisition port 20 of each recording device 5 is engaged with a corresponding test connector 10 of the avionics rack 4. In this case, the outer face 38 which is provided with the acquisition port 20 faces the front panel 8 of the avionics rack 4.

Each test connector 10 is connected to all or some of the data buses 11 of the aircraft 2 in which the avionics rack 4 is embedded.

In use, signals circulate over the data buses 11 of the aircraft 2. All or some of these signals are available at each test connector 10, and are applied by each test connector 10 to the acquisition port 20 with which it is engaged.

For each recording device 5, the collection unit 26 acquires at least some of the signals applied to the acquisition port 20 by the corresponding test connector 10, and the memory 28 stores the signals acquired by the collection unit 26.

When the aircraft is in a predetermined situation, for example as soon as it is detected that the aircraft is on the ground, or even transmitted automatically during a memory 28 reading procedure, the wireless communication module 30 transmits, in at least one predetermined frequency band, the signals stored in the memory 28 which have been acquired by the collection unit 26.

As a variant, the wireless communication module of the recording device 5 is replaced by a wired communication module. The wired communication module differs from the wireless communication module 30 previously described only in that it is configured to transmit the data stored in the memory 28 through a wired link, for example a wired link conforming to a USB (acronym for "Universal Serial Bus") standard, or even a wired link configured to implement a packet-switched local area network protocol, also known by the name "Ethernet" (such a protocol conforming to an ISO/IEC 8802-3 standard).

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An acquisition system for aircraft, comprising
an avionics rack, wherein the avionics rack comprises a front panel provided with at least one test connector connected to at least some data buses of the aircraft, and
at least one recording device, the at least one recording device comprising
a housing and an acquisition port, the acquisition port provided on an outer face of the housing, and,
the acquisition port of the at least one recording device directly engaging the at least one test connector of the avionics rack so that a wall of the housing of faces the front panel of the avionics rack,
the at least one recording device configured to acquire at least some signals applied to the acquisition port by the at least one test connector, and to store the acquired signals, and
the at least one recording device configured to receive electrical power necessary for operation of the at least recording device via the acquisition port.

2. The acquisition system according to claim 1, in which the recording device is, furthermore, configured to transmit, in at least one predetermined frequency band, at least some of the stored acquired signals.

3. The acquisition system according to claim 2, in which the at least one recording device is, furthermore, configured to apply a compression method to at least some of the stored acquired signals before a transmission thereof.

4. The acquisition system according to claim 1, in which at least one of the acquisition port or the at least one test connector is compatible with a current aeronautical standard.

5. The acquisition system according to claim 1, in which the recording device has a volume less than or equal to 10 L.

6. An aircraft equipped with an acquisition system according to claim 1.

7. The aircraft according to claim 6, further comprising a communication antenna positioned at a distance from the avionics rack, the recording device being connected to the communication antenna.

* * * * *